United States Patent
Leterrier et al.

(10) Patent No.: US 12,304,119 B2
(45) Date of Patent: May 20, 2025

(54) METHOD OF MOLDING A MOTOR VEHICLE PART COMPRISING A METAL INSERT

(71) Applicant: OPmobility SE, Lyons (FR)

(72) Inventors: Franck Leterrier, Sainte-Julie (FR); Pascal Barbier, Sainte-Julie (FR)

(73) Assignee: OPmobility SE, Lyons (FR)

(*) Notice: Subject to any disclaimer, the term of this patent is extended or adjusted under 35 U.S.C. 154(b) by 215 days.

(21) Appl. No.: 17/812,610

(22) Filed: Jul. 14, 2022

(65) Prior Publication Data

US 2023/0017718 A1    Jan. 19, 2023

(30) Foreign Application Priority Data

Jul. 16, 2021    (FR) ...................................... 2107723

(51) Int. Cl.
| | |
|---|---|
| *B29C 43/00* | (2006.01) |
| *B29C 43/18* | (2006.01) |
| *B29C 51/12* | (2006.01) |
| *B29C 70/68* | (2006.01) |
| *B62D 29/00* | (2006.01) |
| *B29K 705/00* | (2006.01) |
| *B29L 31/30* | (2006.01) |

(52) U.S. Cl.
CPC .............. *B29C 43/18* (2013.01); *B29C 51/12* (2013.01); *B29C 70/68* (2013.01); *B62D 29/004* (2013.01); *B29K 2705/00* (2013.01); *B29L 2031/3005* (2013.01)

(58) Field of Classification Search
CPC ......... B29C 43/18; B29C 70/68; B29C 51/12; B62D 29/004; B60J 5/0484; B60J 5/107

USPC .............. 264/266; 296/50, 57.1, 106, 146.8, 296/187.01, 56

See application file for complete search history.

(56) References Cited

U.S. PATENT DOCUMENTS

| | | | |
|---|---|---|---|
| 6,019,418 A * | 2/2000 | Emerling | B60J 5/101 |
| | | | 296/146.7 |
| 8,216,501 B2 * | 7/2012 | Egerer | B29C 43/18 |
| | | | 264/261 |
| 2005/0079779 A1 | 4/2005 | McLeod et al. | |

(Continued)

FOREIGN PATENT DOCUMENTS

| | | |
|---|---|---|
| EP | 1927453 A1 | 6/2008 |
| EP | 1995034 A2 | 11/2008 |

(Continued)

OTHER PUBLICATIONS

European Office Action received on Jan. 3, 2025 for application No. EP 22 184 612.4 European Patent Office Munich, Germany.

*Primary Examiner* — Dennis H Pedder
(74) *Attorney, Agent, or Firm* — M&B IP Analysts, LLC

(57) ABSTRACT

The present disclosure relates to a method of molding a motor vehicle part, the motor vehicle part being made from thermosetting plastic material and including at least one metal insert having a shape allowing it to extend substantially through the entire thickness of the motor vehicle part, the method being characterized in that it includes the following steps placing the metal insert and the thermosetting plastic material in a mold, and molding the motor vehicle part comprising the overmolded metal insert, the metal insert being deformed at least at one mechanical weakening zone by closing the mold for molding the motor vehicle part.

15 Claims, 6 Drawing Sheets

(56) References Cited

U.S. PATENT DOCUMENTS

2008/0292851 A1 11/2008 Egerer et al.
2013/0082416 A1 4/2013 Wakeman
2021/0078224 A1 3/2021 Delaney et al.
2021/0170646 A1 6/2021 Meslin et al.

FOREIGN PATENT DOCUMENTS

EP 2974849 A1 1/2016
JP S6364708 B 3/1994

* cited by examiner

[Fig. 1a]
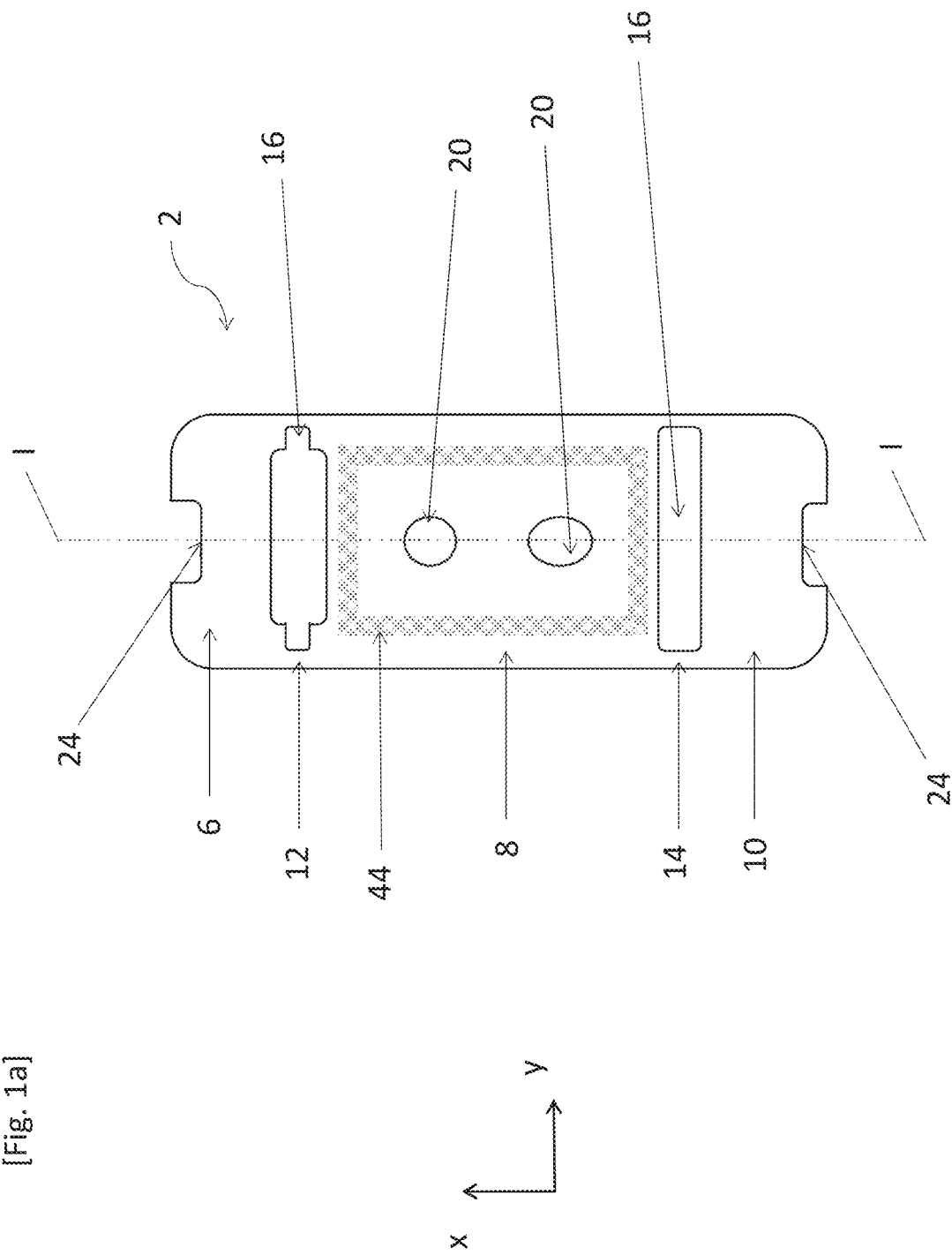

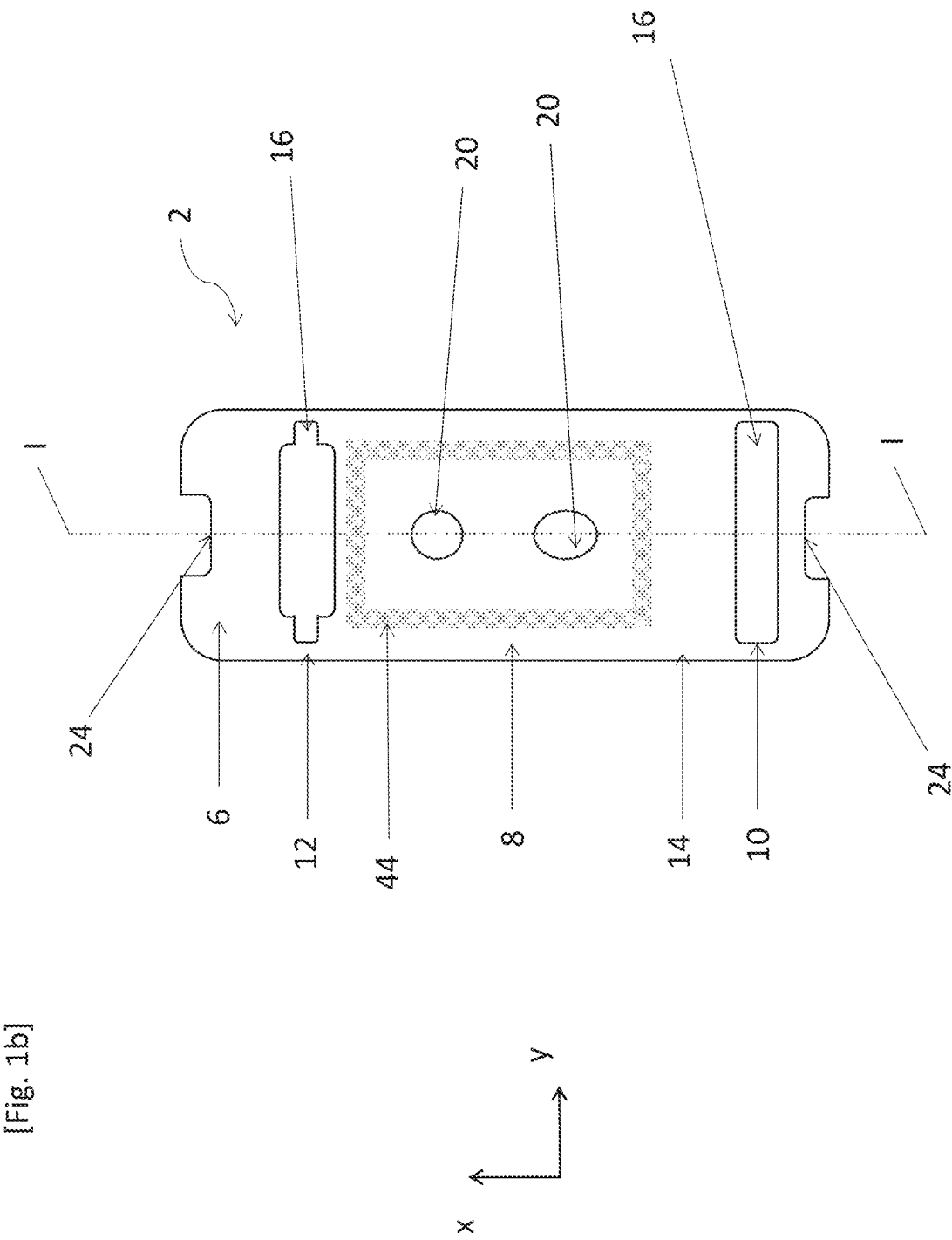

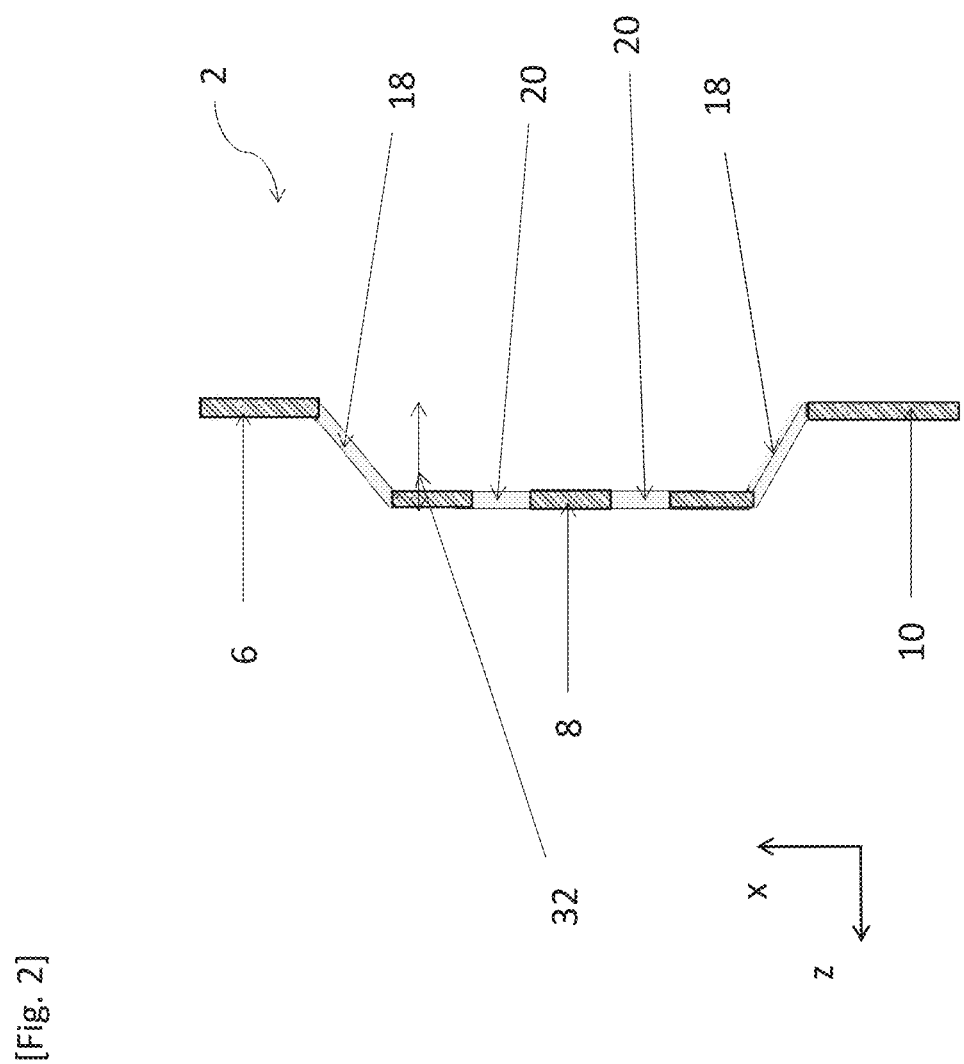
[Fig. 2]

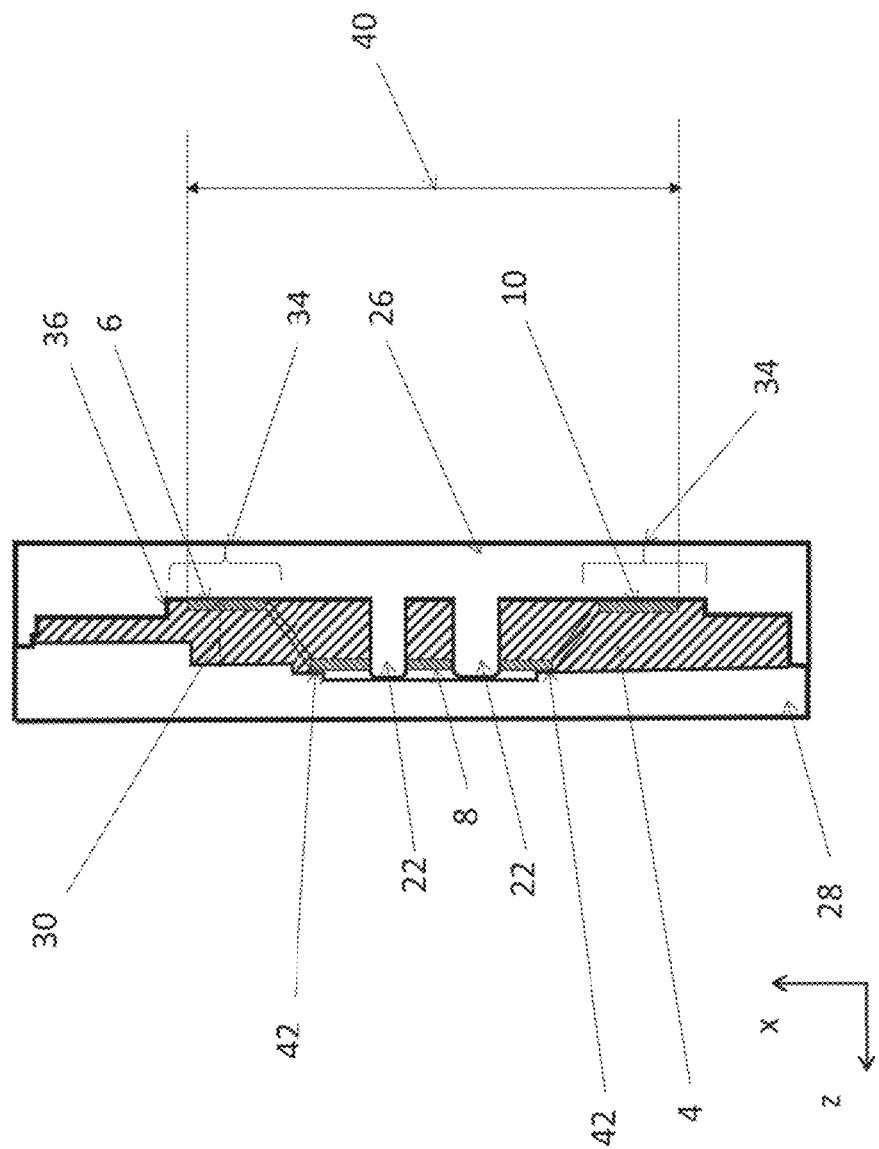

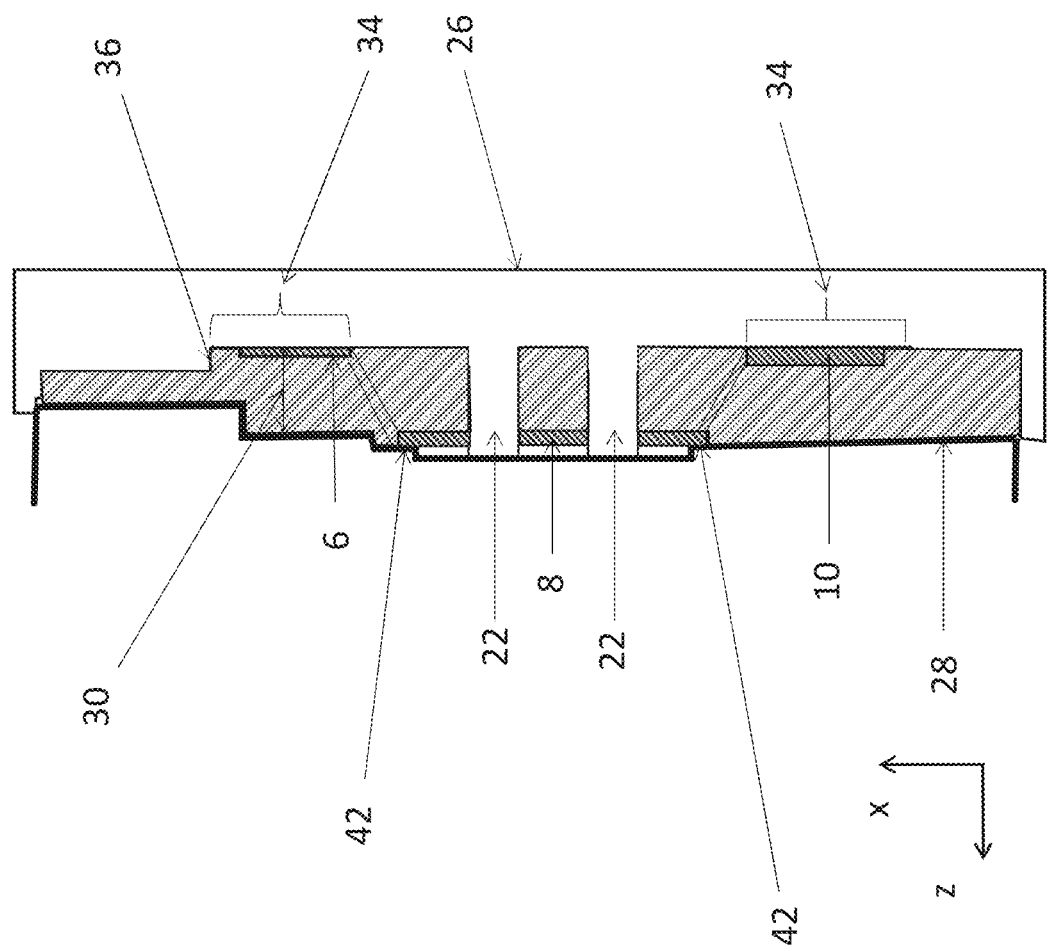
[Fig. 3b]

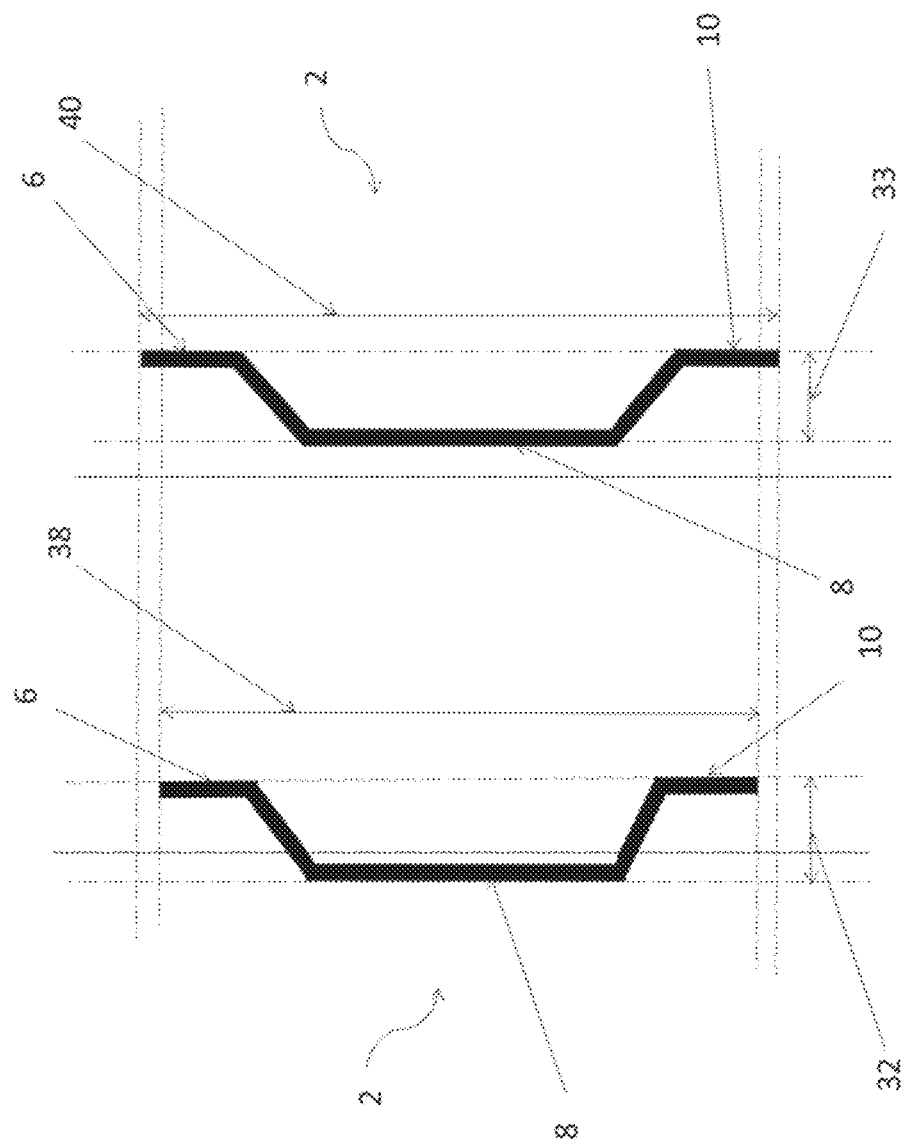
[Fig. 4]

METHOD OF MOLDING A MOTOR VEHICLE PART COMPRISING A METAL INSERT

The present disclosure relates to molding vehicle parts made from thermosetting material comprising a metal reinforcement, and more particularly reinforcements for a motor vehicle.

Certain motor vehicle body panels are made of plastic material, and more particularly of thermoplastic material. Mention may be made, for example, of the case of a motor vehicle tailgate comprising an inner panel, or lining, made of thermoplastic material, conventionally filled with reinforcing fibers, for example filled with glass fibers or talc to increase its resistance properties. This has an advantage in terms of ease of manufacture (injection molding) as well as in terms of the final weight of the tailgate, which will be light.

A tailgate lining undergoes many mechanical stresses during its manufacture, mainly geometric deformations inherent to the molding process, and mechanical stresses during its use once it is assembled on the vehicle.

In order to better withstand the mechanical operating forces on the vehicle, the inner lining is generally reinforced by sheet metal reinforcing elements obtained through a conventional cutting, stamping and punching process. These reinforcing elements can be overmolded in the thermoplastic material of the lining at the hinge, ball joint or lock areas, in order to offset the various forces produced by the equipment (hinges, jacks, stops or gasket) and which generate deformations. The robustness efficiency of the overmolded reinforcement depends on the quality of the mechanical coupling between the bodywork part and the reinforcement.

However, the manufacture of metal reinforcement is the result of various cutting, bending, stamping and welding operations of one or more sheet metal elements, and these reinforcements still represent a significant weight compared to the overall lightening expected on a plastic tailgate.

Alternatively, it is possible to make reinforcements in thermosetting plastic material. The latter have the advantage of being lighter compared to metal reinforcements. They are conventionally overmolded in a body panel made of thermoplastic material. However, they are therefore devoid of metal. Now, the presence of metal parts accessible at the reinforcement has one or even several uses. For example, the following interests can be cited:
- a metal part can be used as additional reinforcement at extremely stressed zones such as the hinge zone (this can even prove to be essential in a tailgate hinge zone): the metal part will then be used to fix the tailgate on the structure of the vehicle to ensure optimal functionality over time, by providing a local "metal-to-metal"-type fastening interface;
- a metal reinforcement insert can be used to ensure electrical conductivity in the zone in which it is placed; and
- a metal reinforcement insert can make it possible to ensure automated handling by a robot and/or retention of the reinforcement in a mold of a body panel by being magnetized in the latter. This insert is therefore made of steel to allow such magnetization.

For the reasons mentioned above, it would be possible to add one or more metal parts before or after overmolding a reinforcement made of thermosetting material in a motor vehicle body panel made of thermoplastic material. However, this often needs a recovery step at the reinforcement or the panel, which implies a loss of manufacturing time and an increase in manufacturing costs.

It could therefore be appropriate to provide for overmolding metal parts in a reinforcement made of thermosetting material. However, this is faced with a problem of positioning these metal parts in the mold of the reinforcement.

Indeed, compression molding thermosetting material is special compared to injection molding: the two parts of the mold are not closed on each other from the start of molding, which does not allow the reinforcement to be kept firmly locked between the punch and the die of the mold all throughout the molding.

In addition, the thickness of the reinforcement made from thermosetting material, for example made of SMC (Sheet Molding Compound), being molded can vary by approximately +/−0.2 millimeters due to the very nature of the compression molding. The overmolded metal part could therefore not occupy the desired position or even undergo an undesired deformation. The obtained result would therefore be unsatisfactory.

Moreover, this problem is not specific to reinforcements, but to any part made of thermosetting plastic material comprising at least one metal insert to fulfill the aforementioned functions.

The object of the present disclosure is in particular to provide a method for molding a motor vehicle part made from thermosetting material, for example a reinforcement of a motor vehicle body panel, and comprising at least one metal insert, which method makes it possible to ensure optimal positioning of said metal insert in the motor vehicle part.

To this end, the present disclosure relates to a method for molding a motor vehicle part, the motor vehicle part being made of thermosetting plastic material and comprising at least one metal insert having a shape allowing it to extend substantially throughout the thickness of the motor vehicle part, the method comprising the following steps:
- placing the metal insert and the thermosetting plastic material in a mold,
- molding the motor vehicle part comprising the overmolded metal reinforcement, the metal reinforcement being deformed at least at one mechanical weakening zone by closing the mold for molding the motor vehicle part.

Thus, the metal insert extending throughout the entire thickness of the future motor vehicle part can deform at determined zones if the air gap between the die and the punch of the mold in the closed position (which corresponds to the final thickness of the molded part) is less than the height of the metal reinforcement before molding. This also makes it possible to envisage accessibility of the metal insert from the surface of the molded motor vehicle part.

The presence of these mechanical weakening zones makes it possible to ensure that the metal insert can be deformed in a controlled manner (i.e. at chosen zones or in a chosen way and under controlled stresses and deformations).

According to other optional features of the molding method, taken alone or in combination:
- the mold comprises at least a first bearing surface for the metal insert, at least one bearing portion forming part of the metal insert sliding along the first bearing surface during the deformation of the metal insert. The metal insert in deformation can therefore move relative to the mold in a predictable manner in areas dedicated to this;
- at least one bearing portion forming part of the metal insert and/or a connecting portion is deformed during the closing of the mold;

the bearing portion forming part of the metal insert and/or the connecting portion is deformed at least at one pre-bent zone;

the bearing portion forming part of the metal insert and/or the connecting portion is deformed at least at one thinner zone; and the mold comprises at least one second bearing surface for at least one compression portion of the metal insert, one face of this compression portion being in direct contact with the second bearing surface during the molding step. This makes it possible to keep at least one face visible on the surface of the motor vehicle part.

The present disclosure also relates to a metal insert for a motor vehicle part made of thermosetting plastic material, the metal insert comprising at least one mechanical weakening zone arranged to allow deformation of the metal insert in a mold.

According to other optional features of the metal insert taken alone or in combination:

the metal insert comprises at least one bearing portion and at least one compression portion, extending over at least two different levels as well as at least one connecting portion connecting the bearing portion and the compression portion to one another;

at least one mechanical weakening zone is formed at the connecting portion and/or of the bearing portion;

at least one thinner zone is formed at the connecting portion and/or the bearing portion;

at least one pre-bent zone is formed at the connecting portion and/or the bearing portion;

the connecting portion extends between the bearing portion and the compression portion without being parallel thereto;

at least one face of the bearing portion and/or of the compression portion intended to be in contact with the mold has the same shape as that of the motor vehicle part. This allows the metal insert to match the shape of the mold and to have visible faces on the molded part; and the metal insert is a metal reinforcement of a motor vehicle part, preferably made of steel.

The present disclosure also relates to a motor vehicle part made of thermosetting material comprising at least one metal insert according to the disclosed embodiments.

According to other optional features of motor vehicle part taken alone or in combination:

at least one face of the metal insert is visible on the surface of the vehicle part. This makes it possible to use the metal insert as a possible interface for fixing a panel comprising the motor vehicle part to a metal element of the structure of the vehicle, to ensure electrical conductivity, or even to ensure optimum placement of the vehicle part overmolded in the panel;

the face of the metal insert visible on the surface of the motor vehicle part comprises at least one through recess. One or more through recesses can be used to fix a panel to the structure of the vehicle; and the motor vehicle part is a reinforcement, preferably of a motor vehicle tailgate lining.

BRIEF DESCRIPTION OF THE FIGURES

The various embodiments will be better understood upon reading the description that follows, given solely by way of example and with reference to the amended drawings, in which:

FIG. 1a is a front view of a metal insert according to a first embodiment;

FIG. 1b is a front view of a metal insert to show a mechanical weakening zone on a bearing portion according to a first embodiment;

FIG. 2 is a sectional view along section plane I-I of the metal insert according to FIG. 1;

FIG. 3a is a sectional view of a mold in the final closed position of a motor vehicle part according to the embodiment comprising the metal insert of FIG. 1 and according to a section plane similar to the section plane I-I;

FIG. 3b is a sectional view of a mold in the final closed position of a motor vehicle part according to the embodiment comprising the metal insert with a thinner mechanical weakening zone and according to a section plane similar to the section plane I-I;

FIG. 4 is a sectional view of a metal insert before molding (left part) and after molding (right part);

FIG. 5a is a sectional view of a metal insert according to a first variant of a second embodiment;

FIG. 5b is a sectional view of a metal insert according to a second variant of a second embodiment;

FIG. 5c is a sectional view of a metal insert according to a third variant of a second embodiment.

DETAILED DESCRIPTION

Reference is now made to FIG. 1 illustrating a metal insert 2 for a motor vehicle part 4 (visible in FIG. 4 but still in the mold, the mold being in the final closed position), for example a metal fixing element for fastening a reinforcement made from a thermosetting material for a body panel.

This metal insert 2 is intended to be molded into the motor vehicle part 4, which is made from a thermosetting material. The metal insert 2 has a shape allowing it to extend over the entire height of the motor vehicle part 4 and is preferably at least partially accessible at the surface of the motor vehicle part 4. This means that, even if the metal insert 2 has a smaller thickness than that of the motor vehicle part 4, its shape, for example stepped, allows it to extend over the entire height of the motor vehicle part 4. This accessibility makes it possible, as explained previously, to fulfill various functions such as for example use as an interface for fixing a body panel to a vehicle structure, use as an electrical conductor or even as an element for positioning the motor vehicle part 4 in a mold by magnetization (in collaboration with a permanent magnet or an electromagnet), the metal insert 2 being made of steel for this purpose. As an alternative to steel, the metal insert 2 can be made from copper or aluminum. The choice of material may be dictated by the function of the accessible metal insert 2 or even by reasons of lightening the molded motor vehicle part 4.

In the example illustrated in FIGS. 1 and 2 illustrating a first embodiment, the metal insert 2 comprises three flat portions, extending in two different planes (therefore on two levels) and parallel to each other as well only two connecting portions 12 and 14 of the planar portions, mechanical weakening zones 16 being formed at the connecting portions 12 and 14 (the number of mechanical weakening zones 16 as well as their position and their shape may vary). More precisely, the mechanical weakening zones 16 can be formed by holes made at the connecting portions 12 and 14 and made in the illustrated example in a transverse direction of the metal insert 2. These holes are intended to be crossed by thermosetting material.

Of course, the three portions above are not necessarily flat; their number can vary, as can the number of planes in which they extend. The metal insert may comprise at least one bearing portion 6 or 10 intended to cooperate with a first bearing surface 34 of a first mold part, in the example illustrated (and described later) of a die 26 of the mold, and at least one compression portion 8 intended to cooperate with a second bearing surface 42 of a second mold part, in the example illustrated (and described later) of a punch 28 of the mold. The die 26 and the punch 28 could be reversed, the die 26 carrying the second bearing surface 42 while the punch 28 would carry the first bearing surface 34. This will be described later.

In addition, the mechanical weakness zone(s) 16 are not necessarily positioned at the connecting portions 12 and 14 (they could be at the bearing portions 6 or 10) and are not necessarily formed by holes. For example, FIGS. 5a to 5c illustrate three variants of a second embodiment in which the metal insert 2 before molding (shown in dotted lines) comprises at least one pre-bent zone 18 at the connecting portion 12 (FIGS. 5b and 5c) or at the bearing portion 6 (FIG. 5b). Obviously, these pre-bent zones can have a variable shape (a marked bend or even a curved zone), a variable number and can be carried by any bearing or connecting portion. The same goes for making holes, FIG. 1 illustrating two holes of different shapes on the connecting portions 12 and 14. Finally, the mechanical weakness zones 16 can be formed by thinner zones.

In any case, the mechanical weakening zone(s) 16 allow deformation of the metal insert 2 during molding of the motor vehicle part 4, as will be seen later, and are therefore positioned at the metal insert 2 at zones of the metal insert 2 allowing this predictable deformation to be obtained.

Preferably, the metal insert 2 comprises at least one through recess 20, two in the example illustrated in the figures, made in the flat portion 8. These through recesses 20 are intended to be passed through by retaining bosses (for example pins) 22 present in the mold of the motor vehicle part 4. This collaboration contributes to the precise location of the metal insert 2 in a mold. The through recesses 20 could also be provided at the flat portions 6 and 10.

The through recesses 20 may have a shape complementary to that of the retaining bosses 22, for example a round shape to collaborate with tubular retaining bosses 22.

It is also possible for at least one of the through recesses 20 to have an oblong shape while cooperating with a tubular retaining boss 22. This ensures guidance of the metal insert 2 in deformation in a mold and in a direction parallel to a longitudinal axis of the metal insert 2.

Still with a view to guiding the metal insert 2 in deformation in a mold, the latter may comprise guide slots 24. The latter are arranged to cooperate with guide lugs (not shown) formed in a mold. The side walls of the metal insert 2, which extend in a direction parallel to a longitudinal axis of the metal insert 2, can also allow the latter to be guided. All these elements contribute in particular to preventing rotation of the metal insert 2 in the mold.

As explained above, the metal insert 2 is intended to be overmolded in a motor vehicle part 4, the latter then being able to serve as reinforcement for a body panel, for example made of thermoplastic material. It can be a tailgate lining with one or more reinforcements placed at the hinge, ball joint or lock zones, in order to compensate for the various forces produced by the equipment (jacks, stops or gasket) and which generate deformations.

This reinforcement can for example be molded into the body panel or attached to the latter by any means known to those skilled in the art (bonding, riveting, etc.).

Preferably, at least one face of the metal insert 2 is visible on the surface of the motor vehicle part 4. As explained above, this can be useful for:

fixing the body panel to a vehicle structure, for example fixing a tailgate to a vehicle structure at a hinge zone, via the motor vehicle part 4 which here is a reinforcement by using a very rigid part of the latter (i.e. the metal insert 2), using the metal insert 2 to ensure electrical conductivity, or even using the metal insert 2 to magnetize the motor vehicle part 4 in a mold for molding a body panel.

It is even possible to envisage several faces of several portions of the metal insert 2 being visible, for example on both sides of the motor vehicle part 4. In any case, at least one face of the bearing portion 6, 10 and/or of the compression portion 8 intended to be in contact with the mold can have the same shape as that of the motor vehicle part 4.

It is possible for one or more face of the metal insert 2 visible on the surface of the motor vehicle part 4 to comprise at least one through recess 20. The through recesses 20 can therefore have two functions: a first for positioning the metal insert 2 in a mold by interacting with the retaining bosses 22 and a second for fixing a body panel comprising one or more reinforcements formed by motor vehicle parts 4 via these through recesses 20. Mention may be made, for example, of a screwed fixing of a hinge for a tailgate by means of the through recesses 20, the presence of a metal base being preferable to make this zone more robust.

We will now describe the method for obtaining a motor vehicle part 4 made from thermosetting material and comprising at least one metal insert 2.

The first step includes placing the metal insert 2 as well as the thermosetting material in a mold, for example in a die 26 of the mold. The metal insert 2 can be placed first in the mold, then the thermosetting material is added (a pattern has been cut beforehand taking into account, among other things, the size and shape of the metal insert. This avoids placing the thermosetting material at the desired contact zone between the metal insert 2 and the mold, as explained below. Placing the metal insert 2 first also allows the metal insert 2 to rise in temperature to promote the attachment of the thermosetting material to the metal insert 2 and prevents the thermosetting material from starting to polymerize. The placement order could be different depending on the constraints implied by placing the metal insert 2 in the mold before the thermosetting material.

The mold being placed vertically in a conventional manner (for compression molding), the interaction between the through recesses 20 and the retaining bosses 22 makes it possible to guarantee a good placement of the metal insert 2 when it is placed in the mold. In addition, the molded motor vehicle part 4 therefore comprises through holes 20 that can be used subsequently to attach it to the body panel or to attach the body panel to a structure of the motor vehicle.

The next step includes shaping the motor vehicle part 4 by compression during closure of the mold. This is the mold closing step, which includes the travel time of a punch 28 relative to a die 26 to a final closed position. The punch 28 of the mold is closed over the die 26. The amount of thermosetting material in the mold will determine the air gap between the die 26 and the punch 28. The thickness of the motor vehicle part 4 formed is therefore variable, the height of the metal insert 2 being chosen to be greater than the expected thickness of the motor vehicle part 4.

The thickness of the motor vehicle part 4 obtained therefore varies as stated above due to the compression molding.

This is visible by comparing the two metal inserts shown in FIG. 4 (on the left outside the mold before molding and on the right after molding), at which it is observed that the height 32 of the metal insert 2 before molding (left part) is greater than the height 33 of the metal insert 2 after molding of the motor vehicle part 4 corresponding to the air gap 30 between the die 26 and the punch 28 after closing the mold. The metal insert 2 extending over the entire thickness of the motor vehicle part 4 (the bearing portions 6 and 10 and the compression portion 8 being in contact with the die 26 or the punch 28), the latter will undergo a deformation, the latter being foreseeable owing to the presence of at least one mechanical weakening zone 16.

As a result, the metal insert 2, the flat portions 6 and 8 of which can be seen in FIG. 4, has undergone deformation without this altering its subsequent function(s), as will be described below.

To obtain this deformation of the metal insert 2 in the thickness of the mold according to the first embodiment, the latter may comprise first bearing surfaces 34, for example of the die 26, opposite the bearing portions 6 and 10 and second bearing surfaces 42 of the punch 28 facing the compression portion 8, these portions of the metal insert 2 being able to remain visible on the motor vehicle part 4. The bearing portions 6 and 10 can slide along the first bearing surfaces 34 during the deformation of the metal insert 2 according to the first embodiment. In other words, and during the deformation of the metal insert 2 in the thickness of the mold, the mold allows sliding of the metal insert 2 on the first bearing surfaces 34 of the die 26 by its ends, in order to compensate for the reduction in height of the metal insert 2 by an elongation of the latter, authorized by the mechanical weakening zones 16.

The first bearing surfaces 34 of the die 26 can be sized to allow an elongation of the metal insert 2 within a determined limit. To this end, FIG. 3 shows the presence of a stop 36 forming the end of a first bearing surface 34 of the die 26 whose position relative to the metal insert 2 (i.e. the distance between the ends of the metal insert 2 formed by the bearing portions 6 and 10 and the stop 36) determines the maximum authorized elongation of the metal insert 2.

The consequence of this slippage can be seen in FIG. 4, in which the initial length 38 of the metal insert 2 (i.e. before molding) is less than the final length 40 of the metal insert 2 (i.e. after molding, or when the mold is in the final closed position as shown in FIG. 3). This variation in length is therefore correlated with the variation in thickness described above.

According to variants of a second embodiment visible in FIGS. 5a to 5c and corresponding to a deformation by bending owing to the presence of at least one pre-bent zone 18, at least one bearing zone 6, 10 and/or at least one connecting zone 12, 14 is deformed when the mold is closed. This deformation corresponds to an amplification of the pre-bending of the pre-bent zones 18. The pre-bent zone 18 can comprise a bend or even a curvature before molding.

In this embodiment, the height 32 of the metal insert 2 before molding is greater than the height 33 of this same metal insert 2 after molding. However, this reduction in height was compensated by a deformation of the metal insert 2 at the pre-bent zone(s) 18. Therefore, no elongation of the metal insert 2 takes place. Obviously, it would be possible to combine the first and second embodiments within the same metal insert 2 with, for example, a sliding of the bearing portions 6 and 10 against the bearing surfaces 34 followed by a deformation of the metal insert 2 once the bearing portions 6 and 10 are in abutment against the stop 36.

The mold can comprise at least one second bearing surface 42, for example of the punch 28, for at least one compression portion 8 of the metal insert 2, one face of this compression portion 8 being in direct contact with the second bearing surface 42 (and therefore isolated from the thermosetting plastic material by this second bearing surface 42) during the molding step. To this end, FIG. 1 shows an illustration of the bearing zone 44 of the second bearing surface 42 of the punch 28 on the compression portion 8.

Thus, the presence of the second bearing surface 42 of the punch 28 makes it possible to guarantee, owing to the direct contact with the compression portion 8, that the face of the compression portion 8 is visible on the surface of the motor vehicle part 4, for example without being covered with a web of plastic material, for the reasons explained above, for example to leave the compression portion 8 comprising the through recesses 20 accessible to the surface of the motor vehicle part 4. FIG. 1 shows that the zone of the compression portion 8 located inside the representation of the bearing zone 44 will not be covered with thermosetting material during the molding of the motor vehicle part 4.

As illustrated in FIG. 3, the second bearing surfaces 42 of the punch 28 can cover only the periphery of the isolated portion, here a part of the compression portion 8.

It is possible to envisage that the first bearing surface(s) 34 also play a role of isolating at least part of the faces of the bearing portions 6 and 10 in contact with them in order to leave these faces accessible to the surface of the molded motor vehicle part 4.

The disclosed embodiments are not limited to the embodiments described here, and other embodiments will become clearly apparent to a person skilled in the art.

It is in particular possible for the shape of the metal insert 2 to be different from that with three flat portions illustrated in the present application. It is also possible to modify the shape, the number or even the positioning of the through recesses, of the guide or ink slots of the mechanical weakening zones.

The invention claimed is:

1. A metal insert for a motor vehicle part of a motor vehicle body panel, comprising: at least one mechanical weakening zone arranged as part of the metal insert, wherein the at least one mechanical weakening zone of the metal insert is adapted to deform in a mold under a stress thereby elongating the metal insert lengthwise, wherein the motor vehicle part is made of a thermosetting plastic material.

2. The metal insert according to claim 1, the metal insert comprising at least one bearing portion, at least one compression portion, extending over at least two different levels, and at least one connecting portion connecting the at least one bearing portion and the at least one compression portion to one another.

3. The metal insert according to claim 2, wherein at least one mechanical weakening zone is formed at at least one of: the connecting portion and the bearing portion.

4. The metal insert according to claim 3, wherein at least one thinner zone is formed on at least one of: the connecting portion and the bearing portion.

5. The metal insert according to claim 3, wherein at least one pre-bent zone is formed on at least one of: the connecting portion and the bearing portion.

6. The metal insert according to claim 2, wherein the connecting portion extends between the bearing portion and the compression portion without being parallel thereto.

7. The metal insert according to claim 2, wherein at least one face of the bearing portion and/or of the compression portion in contact with the mold has a same shape as that of the motor vehicle part.

8. The metal insert according to claim 1, the metal insert is a metal reinforcement of the motor vehicle part.

9. A motor vehicle part made of a thermosetting material comprising at least one metal insert according to claim 1.

10. The motor vehicle part according to claim 9, wherein at least one face of the metal insert is visible on a surface of the motor vehicle part.

11. The motor vehicle part according to claim 10, wherein the at least one face of the metal insert visible on the surface of the motor vehicle part comprises at least one through recess.

12. The motor vehicle part according to claim 9, wherein the motor vehicle part is a reinforcement.

13. The metal insert according to claim 2, wherein the metal insert is made of steel.

14. The motor vehicle part according to claim 12, wherein the motor vehicle part is the reinforcement of a motor vehicle tailgate lining.

15. A metal insert for a motor vehicle part of a motor vehicle body panel, comprising: at least one mechanical weakening zone arranged as part of the metal insert, wherein the at least one mechanical weakening zone of the metal insert is adapted to deform in a mold under a stress to reduce a height of the metal insert, wherein the motor vehicle part is made of a thermosetting plastic material.

\* \* \* \* \*